United States Patent
Morimoto

(10) Patent No.: US 7,344,236 B2
(45) Date of Patent: Mar. 18, 2008

(54) INK-JET CLOTH PRINTING INK AND AN INK-JET RECORDING METHOD

(75) Inventor: Hitoshi Morimoto, Hachioji (JP)

(73) Assignee: Konica-Minolta Holdings, Inc., Tokyo (JP)

( * ) Notice: Subject to any disclaimer, the term of this patent is extended or adjusted under 35 U.S.C. 154(b) by 246 days.

(21) Appl. No.: 10/932,939

(22) Filed: Sep. 2, 2004

(65) Prior Publication Data

US 2005/0057631 A1    Mar. 17, 2005

(30) Foreign Application Priority Data

Sep. 12, 2003 (JP) ............................. 2003-320895
Sep. 17, 2003 (JP) ............................. 2003-324259

(51) Int. Cl.
*G01D 11/00* (2006.01)
(52) U.S. Cl. .................... 347/100; 347/95; 106/31.27
(58) Field of Classification Search ................ 347/100, 347/95, 96, 105, 101; 106/31.27, 31.13, 106/31.6; 523/160
See application file for complete search history.

(56) References Cited

U.S. PATENT DOCUMENTS 4,969,951 A * 11/1990 Koike et al. ................ 347/100
5,764,261 A * 6/1998 Koike et al. ................ 347/100
2002/0050226 A1* 5/2002 Oki et al. ................ 106/31.46
2002/0135650 A1* 9/2002 Nagai et al. ................ 347/100
2003/0169320 A1 9/2003 Tomotake et al.

FOREIGN PATENT DOCUMENTS

| EP | 0711867 A1 | 5/1996 |
|----|------------|--------|
| EP | 1 213 332 A1 | 6/2002 |
| EP | 04 02 1189 | 12/2004 |
| JP | 06145568 | 5/1994 |
| JP | 09291235 | 11/1997 |
| WO | WO 02/062905 A2 | 8/2002 |

OTHER PUBLICATIONS

XP-002309920 Database WPI Derwent Publications Ltd.

* cited by examiner

*Primary Examiner*—Manish S. Shah
(74) *Attorney, Agent, or Firm*—Lucas & Mercanti, LLP

(57) ABSTRACT

An ink-jet cloth printing ink containing a disperse dye, a dispersing agent, water and a water-soluble organic solvent, wherein the average particle diameter of the disperse dye is from 100 nm to 300 nm and the solubility of the dye in the ink is from $10^{-5}$ to $10^{-3}$.

12 Claims, No Drawings

INK-JET CLOTH PRINTING INK AND AN INK-JET RECORDING METHOD

FIELD OF THE INVENTION

The present invention relates to an ink-jet cloth printing ink and an ink-jet recording method employing the ink-jet cloth printing ink.

BACKGROUND OF THE INVENTION

In the field of the cloth printing, an ink-jet print method is demanded for responding to shortening of delivery period and producing of various kind products in small amount. Disperse dyes are usually employed for dying of the fiber such as polyester fiber. When the disperse dye is employed for ink-jet printing, however, there are many restrictions on the selection of the dye such as the dispersion suitability for making fine particles, prevention of nozzle blocking and stability of the dispersion, additionally to the usual standard of selection of the dye such as the tone and fastness since the dye is ejected from a fine nozzle. Moreover, there are subjects such as prevention of blocking of the fine nozzle by coarse particles and the variation of the physical properties of the ink and the precipitation of solid components in the course of the production and storage of the ink. In the ink in which the disperse dye is employed as the colorant, the coarse particles are easily formed compared with a dye ink which is a complete solution because the large particles contained in the disperse dye ink include large particles formed by the aggregation of the dispersed colorant particles during the storage additionally to a fine dust particles since such the ink is a dispersion system comprising the colorant particles dispersed in an aqueous medium. Japanese Patent Publication Open to Public Inspection, hereinafter referred to as Japanese Patent O.P.I. Publication, No. 64-48875 described a method to remove the coarse particles in the ink causing the blocking of the nozzle and the precipitation of the solid components by filtration or centrifuge in the course of the production process.

Moreover, various proposes to stably disperse the pigment in the ink composition have been presented. For example, Japanese Patent Examined Publication No. 55-35434 proposes the application of a polymer having a lipophilic portion and a hydrophilic portion as the dispersing agent for dispersing the pigment. Japanese Patent Examine Publication No. 4-5703 proposes the employment of a polymer having a lipophilic portion having a molecular weight within a specified range and a hydrophilic portion as the dispersing agent for dispersing the pigment.

In the disperse dye ink, sufficient stability cannot be obtained by the method of removing the coarse particles in the course of the production, and the problems cannot completely solved by optimization of the kind of the surfactant or the dispersing agent by the same approach in the case of pigment.

On the other hand, gas dissolved in the ink some times causes degradation of the resolution and the clarity of the printed image, and formation of fine bubbles causing the blocking of nozzle. Japanese Patent O.P.I. Publication No. 10-298470 describes a method to remove by permeation of the dissolved gas by passing the ink through a hollow fiber membrane having gas permeability and reducing the pressure outside of the hollow fiber membrane. Such the method, however, does not bring sufficient effect on the entire inks, and the bubbles in the disperse dye ink are difficultly removed by such the deaeration treatment.

In the above situation, the object of the invention is to provide an ink-jet cloth printing ink excellent in the jetting ability and the storage stability.

SUMMARY OF THE INVENTION

The object of the invention can be attained by the following constitution.

(1) An ink-jet cloth printing ink containing a disperse dye, a dispersing agent, water and a water-soluble organic solvent, in which the average particle diameter of the disperse dye is from 100 nm to 300 nm and the solubility of the dye in the ink is from $10^{-5}$ to $10^{-3}$.

(2) The ink-jet cloth printing ink described in (1), in which the dye solubility is $10^{-5}$ to $10^{-4}$.

(3) The ink-jet cloth printing ink described in (1) or (2), in which the ink contains a poly-valent metal and the total content of the poly-valent metal is from 1 ppm to 1,000 ppm, and the disperse dye has a structure capable of forming a chelate compound with the poly-valent metal.

(4) The ink-jet cloth printing ink described in (3), in which the total content of the poly-valent metal is from 10 ppm to 1,000 ppm.

(5) The ink-jet cloth printing ink described in (3), in which the total content of the poly-valent metal is from 100 ppm to 1,000 ppm.

(6) The ink-jet cloth printing ink described in any one of (3) through (5), in which the poly-valent metal is selected from the group consisting of Ca, Mg, Ti, Al, Zn, Fe, Co, Ni and Cu.

(7) The ink-jet cloth printing ink described in any one of (1) through (7), in which the ink is deaerated by a hollow fiber membrane module.

(8) An ink-jet recording method which is performed by ejecting the ink-jet cloth printing ink described in any one of (1) through (7) from an ink-jet head having a nozzle diameter of not more than 30 μm.

(9) An ink-jet recording method in which the recording is performed by ejecting the ink-jet cloth printing ink described in any one of (1) through (7) from an ink-jet head driven by a driving frequency of not less than 20 kHz.

(10) An ink-jet recording method in which the recording is performed by ejecting the ink-jet cloth printing ink described in any one of (1) through (7) from an ink-jet head ejecting the ink in a rate of not less than 6 m per second.

(11) An ink-jet cloth printing method in which the printing is performed on cloth containing polyester fibers by the ink-jet cloth printing ink described in any one of (1) through (7).

(12) An ink-jet recording method in which the recording is performed on cloth containing a polyester fiber by jetting the ink-jet cloth printing ink described in any one of (1) through (7) employing an ink-jet head having a nozzle diameter of not more than 30 μm.

According to the above constitution, an ink-jet cloth printing ink having high stability and inhibited in the nozzle blocking and precipitation of particle can be obtained and ink-jet recording and cloth printing with high precision can be performed by employing such the ink-jet cloth printing ink.

DETAILED DESCRIPTION OF THE PREFERRED EMBODIMENT

Though the best embodiment for practicing the present invention is described in detail below, the invention is not limited thereto.

As a result of the investigation by the inventors relating to the ink-jet cloth printing ink employing a disperse dye dispersed in an aqueous medium as the colorant, the characteristic of the disperse dye that the dye has solubility even though it is very low is noted, and considerably improvement on the storage ability of the ink can be attained.

To the ink-jet cloth printing ink in which a disperse dye is dispersed in a fine particle state, it is required that the dispersion is highly stable, precipitation of the particle does not occur and the blocking of the nozzle and filter is not caused.

It is found in the ink-jet cloth printing ink that the solubility of the disperse dye in the water and an organic solvent, a surfactant and a dispersing agent as the dispersing medium of the disperse dye largely influences on the storage ability and the stability of the dispersed particles.

The disperse dye is sparingly soluble in water but has somewhat of solubility. Particularly, it is found that the solubility is raised accompanied with decreasing of the particle diameter. Therefore, the small particles are dissolved and precipitated on the large particles so as to grow the particles during the period of the storage when the distribution of the particle size is wide, and the particle diameter is gradually increased and the nozzle blocking and the particle precipitation are resulted. The crystal growing rate of is depended on the solubility of the dye. The growing rate of the crystal is made larger when the solubility is high, and is reverse when the solubility is low.

Accordingly, the crystal growing occurs in the disperse dye ink in which the solubility of the dye is high in some degree and the particle size distribution is wide in some degree so as to form coarse particles.

On the other hand, it is difficult to completely remove the bubbles in the dispersion type ink. A solution type ink using a water-soluble dye can be easily deaerated by, for example, a hollow fiber membrane module, but in the dispersion type ink employing a solid dispersed in an aqueous medium, the bubbles adhered on the surface of the solid is difficultly removed completely in some cases by such the method. In such the case, the deaeration cannot be completed and fault of ejection caused by cavitation.

It has been found by the investigation by the inventors that the wetting ability of the colorant particle is low since the affinity of the colorant particle with the solvent and the dispersing agent is low in the ink in which the solubility of the dye is low, and complete remove of the bubbles is particularly difficult is such the case.

It is found by the inventors that the crystal growth can be inhibited and the deaeration can be easily carried out by giving sufficient wettability by controlling the solubility of the dye to be within a specified range. Namely, the blocking by the crystal growing is caused when the solubility of the dye is high, and the deaeration is made difficult and the problem of the fault of ejection is resulted when the solubility of the dye is low. Therefore, in an ink formula having specified dye solubility, the two inconsistent problems can be solved at the same time.

The solubility of the dye is dependent on the entire surface area of the solid particles, and the particle diameter within the range of from 100 nm to 300 nm is effective for solving the above problems. When the particle diameter is within such the range, the crystal growing is small, the adhering amount of the bubbles is also small and the effect of the deaeration is large.

Accordingly, it is found in the ink-jet cloth printing ink relating to the invention, in which the fine particles of the disperse dye are dispersed in water and/or the water-soluble solvent, that the blocking caused by crystal growing does not occur and the adhering amount of the bubbles on the particle surface is small and the effect of the deaeration can be made large when the average diameter of the disperse dye particles is from 100 nm to 300 nm and the dYsolubility of the dye in the ink is within the range of from $10^{-5}$ to $10^{-3}$. The solubility of the dye is more preferably from $10^{-5}$ to $10^{-4}$.

Besides, it is found that the solubility of the dye is raised for improve the wetting ability, the fine particles are dissolved and precipitated on the large particles during the storage so as to grow the crystals and the particle diameter is gradually increased, and the nozzle blocking and the particle precipitation are resulted. The crystal growing rate of is depended on the solubility of the dye. The growing rate of the crystal is large when the solubility is high, and is reverse when the solubility is low.

It is found by the inventors regarding the ink having sufficient wettability that the addition of a poly-valent metal to the ink employing a disperse dye having a structure capable of forming a chelate is effective to lower the growing rate the crystals.

In the invention, the solubility of the dye in the ink is measured by the following procedure.

A solubility measuring solution is prepared, which has a composition the same as that of the ink except that the dye is not contained. To the solubility measuring solution, 0.1% of the powder of the dye is added and stirred for 5 hours at 25° C. After the stirring, not dissolved dye is completely precipitated by centrifugation and the supernatant liquid was sampled. The concentration of the dye dissolved in the supernatant liquid was measured by HPLC. The solubility is represented by the weight of the solute in gram per 100 g of the solution.

In the case of that the ink-jet cloth printing ink according to the invention contains the poly-valent metal; the solubility measuring solution is the same as the ink except that the dye and the poly-valent metal are not contained.

Though there is no specific limitation on the HPLC, the measurement can be performed, for example, by employing Inert Sil ODS-2 (reversed phase silica) as the column, an optional mixture of a 0.1 M ammonium acetate buffer (pH=5) and methanol as the eluate and a UV detector (for example, one detecting 260 nm).

Particularly in the ink to be utilized in a printer, the remaining dissolved gas in the ink causes degradation of the resolution and the clarity of printed image and the formation of fine bubbles.

As the method to remove the remaining dissolved gas from the ink, a deaeration method by a physical means such as boiling and reducing pressure and a method by chemical means by addition of an absorbent to the ink are applicable. Though the deaeration can be performed by any methods, a method is preferred, in which the ink is passed in the air permeable hollow fiber membrane and the pressure of outside of the hollow fiber is reduced so as to remove the gas dissolved in the ink by permeation through the membrane, because the gas dissolved in the ink can be removed by high efficiency without bad influence on the properties of the ink by such the method. When the average particle diameter of the disperse dye is within the foregoing range (from 50 nm to 300 nm), the efficiency of the deaeration is particularly high.

The average particle diameter can be measured by a particle diameter measuring apparatus available on the market utilizing various methods such as a light scattering method, an electrophoretic method and a laser Doppler. A Zetasizer 1000, manufactured by Malvern Instruments Ltd., is cited as a concrete example of a particle size measuring apparatus.

A deaeration method by ultrasonic wave treatment employing an ultrasonic generation apparatus such as UH-600S (20 kHz, 600W) manufactured by SMT Co., Ltd., is also preferred. A method is also preferable, in which the ultrasonic wave generator is attach to the ink streaming pass of the deaeration means employing the hollow fiber membrane so as to combine both the means. By this method, the degree of the deaeration can be controlled by varying the flowing rate of the ink and the remaining amount of dissolved air can be adjusted to a desired value.

In the invention, the remaining amount of dissolved air is preferably made to not more than 30 ppm. It is more preferable that the amount of dissolved air is not more than 20 ppm or from 0.20 ppm to 0 ppm.

The remaining amount of dissolved air can be determined by measuring the remaining amount of oxygen and calculating based on the ratio of oxygen in air.

The remaining amount of dissolved oxygen can be measured by Ostwald's method ("Jikken Kagaku Kouza (Experimental Chemistry Course) Basic Operation [I]" p. 241, Maruzen, 1975), mass spectrographic method, a simple oxygen concentration measuring apparatus such as a Galvani cell type and polarograph type, and a calorimetric method.

The remaining amount of dissolved oxygen also can be measured by an apparatus available on the market such as DO-30A manufactured by To a Denpa Kogyo Co., Ltd. The concentration of dissolved air is calculated from the measured amount of dissolved oxygen based on the ration of oxygen in air.

It is preferred that the record is carried out employing an ink-jet head having a nozzle diameter of from 10 μm to 50 μm to obtain an image with high precision. A nozzle diameter of not less than 50 μm is preferable from the viewpoint of the graininess, and that of not more than 10 μm is preferable since the droplet is influenced by the air stream when the volume of the droplet is too small.

The ink according to the invention is excellent in the stability and contains few coarse particles, and is suitable for the ink-jet recording method employing the small diameter nozzle or the small ink droplets. It is preferable that the ink-jet cloth printing ink is ejected from a nozzle having a diameter of not more than 30 μm, and more preferably not more than 20 μm in the above-described range of from 10 μm to 50 μm because the blocking of the inkjet head and the fault of ejection do not occur even in such cases.

The ink-jet cloth printing ink according to the invention can be employed in the combination with an ink-jet head driven by a driving frequency of not less than 20 kHz or not less than 30 kHz.

The ink according to the invention can be stably employed in the combination with an inkjet head having a ejecting rate of ink of not less than 6 m/sec, preferably not less than 8 m/sec. As above-described, the ink-jet cloth printing ink according to the invention can display sufficient ejection ability even when the head structure and head driving conditions are applied which cannot be sufficiently driven when usual disperse ink is employed.

In the cloth printing method of the invention, it is preferable from the point of the coloring efficiency for the recorded images on cloth containing polyester fibers by the ink-jet printing method employing the ink-jet cloth printing ink according to the invention.

In the cloth printing method of the invention, though the material of the cloth is not specifically limited as long as the cloth is capable of being dyed by the disperse dye, ones containing polyester fiber, acetate fiber or triacetate fiber are preferred. Among them, the cloth containing the polyester fiber is particularly preferred. The cloth may be the fibers in any states such as textile, knitting and nonwoven fabric. As the cloth employable in the invention, though the cloth formed by 100% of fibers capable of dying by the disperse dye is preferable, mixed spinning textile and nonwoven fabric with rayon, cotton, polyurethane, acryl resin, nylon, wool or silk may be usable as the cloth for print dying. The thickness of the yarn forming such the cloth is preferably with in the range of from 10 to 100 d.

In the print dying method of the invention, images are recorded on the cloth containing polyester fiber by the ink-jet method employing the ink-jet cloth printing ink according to the invention.

In the ink-jet cloth printing method according to the invention, it is desirable for obtaining uniform dyed matter that the cloth is washed before the pretreatment by water-soluble polymer to remove natural impurities such as fat, wax, pectin and natural coloring matters, remaining chemicals used in the production process of the cloth such as past, and stain adhered to the cloth fibers. As the washing agent for cleaning the cloth, an alkali such as sodium hydroxide and sodium carbonate, a surfactant such as anionic surfactants and nonionic surfactants, and enzymes are employable.

In the print dying method relating to the invention, it is preferred for preventing the spreading of the dye to give a pre-treatment agent by a pad method, a coating method or spray method to the cloth containing the fibers capable of being dyed by the disperse dye (pre-treatment process). After that, an image is formed on the cloth by the ink-jet method employing the ink having the foregoing constitution (ink providing process), and the cloth on which the ink is provided is subjected to a thermal treatment (color forming process), and then the thermally treated cloth is washed (washing process). Thus print dying of the cloth is completed and the dyed matter is obtained.

The pretreatment method may be optionally selected from known methods so as to fit to the fiber material and the ink without any limitation. For example, the cloth provided with a compound selected from the group consisting of water-soluble metal salts, polycation compounds, water-soluble polymers, surfactants and water repellent agents in an amount of from 0.2 to 50% by weight is preferred because the spreading of the dye can be highly prevented in such the cloth and a high precision image can be printed on the cloth.

Concrete examples of the watersoluble polymer are described below. As the natural watersoluble polymer, starches such as potato starch and corn starch; cellulose derivatives such as carboxymethyl cellulose, methyl cellulose and hydroxyethyl cellulose,; polysaccharides such as sodium alginate, guar gum, tamarind gum, rawcust bean gum and gum Arabic; proteins such as gelatin and keratin; and as the synthesized watersoluble polymer, poly(vinyl alcohol), poly(vinyl pyrrolidone) and acryl polymers are employable. As the surfactant, anionic type, cationic type, amphoretic type and nonionic type are usable. Typically, sulfate of higher alcohol, sulfonate of naphthalene derivatives as the anionic surfactant; quaternary ammonium salts as the cationic surfactant; imidazolin derivatives as the amphoretic surfactant; and polyoxyethylene alkyl ethers, poly (oxyethylene-propylene) block polymers, fatty acid esters of sorbitol, and ethylene oxide additives of acetylene alcohol as the nonionic surfactant are cited. Examples of the water repelling agent are silicone type, fluorinated type and waxes. The watersoluble polymer and surfactant preliminary provided to the cloth are preferably ones stable in high temperature conditions so as to not cause any stain by tar formation on the occasion of the coloring by high temperature. Moreover, the watersoluble polymer and the surfactant previously provided to the cloth are preferably ones capable of easily being removed by the washing treatment after the ink-jet printing and coloring at high temperatures.

In the ink-jet cloth printing method, it is desirable that the cloth is winded up after the print by the ink-jet, colored by heating, washed and dried. In the ink-jet cloth printing method, the dying is not sufficiently carried out only by standing after printing by the ink onto the cloth. When the printing is continued for a long time on clothe having long length, very long printed cloth is accumulated on the floor. And then the accumulated cloth occupies wide space and causes risk and unexpected dirty marks in some cases. Consequently, it is become to necessary to wind up the cloth after the printing. A medium not relating to the image printing such as paper, cloth and vinyl resin sheet may be inserted between the cloths. However, the winding up is not necessary when the cloth is cut on halfway or the short cloth is used.

The coloring process is a process for expressing the original color of the ink by absorbing and fixing of the dye to the clothe, the dye after the printing is only adhered onto the surface of the cloth and not absorbed and fixed by the cloth sufficiently. For the coloring, methods of steaming by steam, baking by dry heating, thermo sol, HT steamer by superheated steam and HP steamer by high pressure steam are applied. The method is optionally selected according to the material to be printed and the ink. The cloth either may be thermally treated just after the printing or after standing for some period for fitting with the use. In the invention, any procedure may be applied.

In the dying by the disperse dye, a carrier may be employed other than the thermal treatment. The compound to be used as the carrier is preferably one having the features such as that the dying acceleration effect is large, the using method is simple, the substance is stable, the load to the human body and the environment is low, and the compound is easily removed from the fibers and not influence on the fastness of the dye. Examples of the carrier are phenols such as o-phenylphenol, p-phenylphenol, methyl naphthalene, an alkyl benzoate, chlorobenzene and diphenyl, ethers, organic acids and hydrocarbons. These compounds accelerate swelling and plasticizing of the difficultly dying fiber such us polyester which is difficultly dyed at a temperature about 100° C. so that the disperse dye is easily permeated into the fiber. The carrier may be either previously absorbed in the cloth or contained in the ink-jet ink.

The washing process is necessary after the thermal treatment. Because of the stability of the color is made instable and the fastness of the color is lowered by the remaining of the dye not contributed to the dying. The removing of the substance for the pretreatment is also necessary. If the substance is leaved intact, not only the lowering of the fastness but also the change color of the cloth are resulted. Consequently, it is essential that the washing is suited for the subjected substance to be removed and the purpose. The method of the washing is selected according to the material of the printed cloth and the ink, for example, a mixture solution of sodium hydroxide, a surfactant and hydrosulfite is usually used in the case of the polyester. Such the method is usually carried out by a continuous system by an open-soaper or a butch system by a liquid flowing dying machine; any methods may be applied in the invention. Drying is necessary after the washing. The washed cloth was dehydrated by squeezing and dried by hanging or by a drying means such as a dryer, a heating roll and an iron.

The disperse dye in the ink-jet cloth printing ink according to the invention is nonionic dyes each having no water-soluble group such as a sulfonic group and a carboxyl group. The dye is dispersed in water employing a dispersing agent and employed for dying of the synthesized fibers. The disperse dye is soluble, different from pigments, in an organic solvent such as acetone and dimethylformamide. The dye is diffused in the fiber in a molecular state on the occasion of dying of the synthesized fibers.

Though these dyes are developed for acetate fibers at the start, recently, the demand for polyester fibers is large. The dyes having higher hydrophilicity and thermal resistivity than those of dye for acetate fibers are selected for polyester fibers. As the basic component of the disperse dye, relatively low molecular weight ones such as mono-azo type, aminoanthraquinone type and diphenylamine type are utilized.

Examples of the preferable disperse dyes are as follows:

C. I Disperse Yellows 3, 4, 5, 7, 9, 13, 23, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 160, 162, 163, 164, 165, 179, 180, 182, 183, 184, 186, 192, 198, 199, 202, 204, 210, 211, 215, 216, 218, 224, 227, 231 and 232;

C. I. Disperse Oranges 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 61, 66, 71, 73, 76, 78, 80, 98, 90, 91, 93, 96, 97, 119, 127, 130, 139 and 142;

C. I. Disperse Reds 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 298, 302, 303, 310, 311, 312, 320, 324 and 328;

C. I. Disperse Violets 1, 4, 8, 23, 26, 27, 28, 31, 33, 35, 36, 38, 40, 43, 46, 48, 50, 51, 52, 56, 57, 59, 61, 63, 69 and 77;

C. I. Disperse Green 9;

C. I. Disperse Browns 1, 2, 4, 9, 13 and 19;

C. I. Disperse Blues 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 25, 259, 2672, 268, 270, 284, 285, 287, 288, 291, 293, 195, 297, 301, 315, 330, and 333; and C.I. Disperse Blacks 1, 3, 10 and 24.

When the ink-jet cloth printing ink contains the polyvalent metal, the dye preferably has a structure capable of forming a coordination bond with the poly-valent metal, in concrete, it is preferable that a chemical structure represented by one of Formulas 1 through 13 is contained in the molecular of the dye.

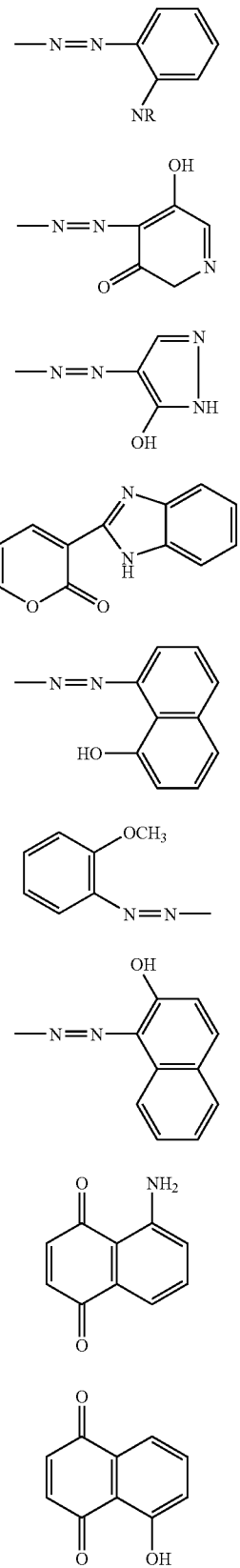

In the formulas, R is a hydrogen atom or an alkyl group.

Among the foregoing disperse dyes available on the market, ones having the structure capable of forming the coordination bond with the poly-valent metal usable in the invention are followings:

C. I. Disperse Yellows 4, 5, 8, 16, 60 and 82;

C. I. Disperse Orange 29;

C. I. Disperse Reds 15, 141 and 210;

C. I. Disperse Violets 1, 4 and 26;

C. I. Disperse Green 1, and

C. I. Disperse Blues 3, 7, 15, 20, 22, 23, 26, 34, 35, 79, 125, 165 and 183.

The dye usable in the invention is not limited to the above-described.

In the ink-jet cloth printing ink according to the invention, the solubility of the dye in the ink or the solubility of the dye in the medium constituting the dispersion system of the ink is controlled by the selection of the disperse dye and another component so as to be within the range of from $10^{-3}$ (g) to $10^{-5}$ (g), and the average particle diameter of the disperse dye is controlled so as to be within the range of from 100 nm to 300 nm.

The solubility of the dye can be controlled by the kind and the amount of the organic solvent used in the ink. The particle diameter of the dispersed dye can be controlled by finish the dispersing at the time when the particle diameter is attained at the designated value.

When the coloring is carried out by a high temperature treatment in the print dyeing employing the disperse dye, a disperse dye having high sublimation fastness is preferably selected so that the sublimated dye does not cause blots on the machine and the white background of the cloth.

The content of the disperse dye is preferably from 0.1 to 20% by weight and more preferably from 0.2 to 13% by weight.

The disperse dye obtained from the market is preferably subjected to a purifying treatment even though it may be employed in the intact state. The method and an organic solvent used in the purification treatment are optionally selected according to the kind of the dye.

The poly-valent metal is preferably one selected from Ca, Mg, Ti, Zn, Fe, Co, Ni and Cu.

The poly-valent metal relating to the invention is preferably added in a state of a metal salt. Though the anion of the salt is not specifically limited, for example, a chloride, sulfide and hydroxide are employed. A salt with an organic compound and an oxide capable of being decomposed and dissolved after the addition may be employed.

Concrete examples of the poly-valent metal compound are listed below, but the salt is not specifically limited thereto: calcium chloride, calcium acetate, calcium oxide, magnesium chloride, magnesium fluoride, magnesium acetate, magnesium bromide, magnesium oxalate, magnesium nitrate, magnesium sulfate, titanium chloride, titanium iodide, aluminum chloride, aluminum oxide, aluminum bromide, aluminum iodide, aluminum sulfate, aluminum nitrate, zinc chloride, zinc bromide, cobalt chloride, nickel chloride and copper chloride. Among them, chlorides of the poly-valent metal are preferred.

As the water-soluble organic solvent in the invention, the followings are cited: poly-valent alcohols such as ethylene glycol, glycerol, 2-ethyl-2-(hydroxymethyl)-1,3-propanediol, tetraethlene glycol, triethylene glycol, tripropylene glycol, 1,2,4-butanetriol, diethylene glycol, propylene glycol, dipropylene glycol, butylene glycol, 1,6-hexanediol, 1,2-hexanediol, 1,5-pentanediol, 1,2-pantanediol, 2,2-dimethyl-1,3-propanediol, 2-methyl-2,4-pentanediol, 3-methyl-1,5-pentanediol, 3-methyl-1,3-butanediol and 2-methyl-1,3-propanediol; mono-valent alcohols such as methanol, ethanol and butanol; alkyl ethers of poly-valent alcohol such as diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, ethylene glycol monobutyl ether, propylene glycol monomethyl ether, propylene glycol monobutyl ether and dipropylene glycol monomethyl ether; 2,2-thiodiethanol; amides such as N-dimethylformamide; heterocyclic compounds such as 2-pyrrolydone, and acetonitrile.

The amount of the organic solvent is preferably from 10 to 60% by weight of the whole weight of the ink.

An inorganic salt may be added to the ink for stabilizing the viscosity of the ink and the dye so as to improving the coloring of the dye. As the inorganic salt, sodium chloride, sodium sulfate, magnesium chloride and magnesium sulfide are employable. The inorganic salt is not limited to the above in the embodiment of the invention.

As the surfactant, cationic, anionic, amphoteric and non-ionic ones all can be employed. Examples of the cationic surfactant include aliphatic amine salts, aliphatic quaternary ammonium salts, benzalconium salts, benzetonium chloride, pyridinium salts and imidazolium salts. As the anionic surfactant, the followings are cited: fatty acid soap, N-acyl-N-methylglycine salts, N-acyl-N-methyl-β-alanine salts, N-acylglutaminates, alkyl ether carboxylates, acylated peptides, alkylsulfonates, alkylbenzenesulfonates, alkylnaphthalenesulfonates, slats of dialkylsulfosuccinic acid ester, alkylsulfoacetates, α-olefinsulfonates, N-acylmethyltaurines, oil sulfates, salts of higher alcohol sulfate, salts of secondary higher alcohol sulfate, alkyl ether sulfates, secondary higher alcohol ethoxysulfates, polyoxyethylene alkylphenyl ether sulfates, monoglysulfates, fatty acid alkylolamide sulfates and alkyl ether phosphate salts. As the amphoteric surfactant, carboxybetaine type ones, sulfobetain type ones, aminocarbonates and imidazolinium betaines are cited. Examples of the nonionic surfactant include polyoxyethylene alkyl ethers, polyoxyethylene secondary alcohol ethers, polyoxyethylene alkylphenyl ethers such as Emulgen 911, polyoxyethylene sterol ethers polyoxyethylene lanoline derivatives, polyoxyethylene polyoxypropylene alkyl ethers such as Newpol PE-62, polyoxyethylen glycerol fatty acid esters, polyoxyethylene castor oil, hardened castor oil, polyoxyethylene sorbitan fatty acid esters, polyoxyethylene sorbitol fatty acid ester, polyethylene glycol fatty acid esters, fatty acid monoglycerides, fatty acid polyglyserides, sorbitan fatty acid esters, propylene glycol fatty acid esters, sucrose fatty acid esters, fatty acid alcanolamides, polyoxyethylene fatty acid amides, polyoxyethylene alkylamines, alkylamine oxides, acetylene glycol and acetylene alcohol. The invention is mot limited to the above-described.

When these surfactants are employed, they may be employed solely or in combination of two or more kinds of them. The adding amount of the surfactant is preferably from 0.001 to 1.0% by weight of the whole amount of the ink, by which the surface tension of the ink can be optionally controlled.

An antiseptic agent and an antimold agent may be added to the ink to keep the stability of the ink for a long period. As the antiseptic and antimold agents, aromatic halide compounds such as Preventol CMK, methylene thiocyanate and halogen-containing nitrogen sulfur compounds such as 1,2-benzisothiazoline-3-one such as Proxel GXL are usable. The invention is limited to them.

In the ink to be used in the invention, the dye can be dispersed by mixing with the dispersing agent, the wetting agent, the dispersion medium and an optional additive and dispersing by a dispersing machine. Known machines such as a ball mill, a sand mill, a line mill and a high pressure homogenizer are usable as the dispersing machine.

The particle size of the disperse dye is not more than 300 nm in average diameter and is controlled to be within the range of from 100 nm to 300 nm. When the average diameter and the maximum diameter is large, the nozzle blocking tends to occur and stable ejection becomes difficult in the ink-jet cloth printing method in which the ink is ejected through the fine nozzles. The average particle diameter can be measured by a diameter measuring apparatus available on the market such as that utilizing the light scattering method, an electrophoretic method or a laser Doppler method. Zetasizer 1000 manufactured by Malvern Instruments Ltd., can be cited as the example of the particle diameter measuring apparatus.

The dispersing agent is a compound to prevent the aggregation of the solid fine particles and stabilize the dispersion. As such the compound, low molecular weight surfactants and polymer dispersing agents are employed.

Examples of the dispersing agent preferably employed in the invention include a formalin condensate of sodium creosote oil sulfonate such as Demol C, a formalin condensate of sodium cresolsulfonate and sodium 2-naphthol-6-sulfonate, a formalin condensate of sodium cresolsulfonate, a formalin condensate of sodium phenolsulfonate, a formalin condensate of sodium β-naphtholsulfonate, a formalin condensate of sodium β-naphthalenesulfonate such as Demol N and sodium β-naphtholsulfonate, ligninsulfonate such as Vanilex RN, a sodium parafinsulfonate such as Efcol and a copolymer of α-olefin and maleic anhydride such as Floren G-700.

The using amount of the dispersing agent is preferably from 20 to 200% by weight of the disperse dye. When the dispersing agent is insufficient, the fine particle dispersion and the stability of dispersion are degraded, and when the agent is excessive, the fine particle dispersion and the stability of dispersion are also degraded and the viscosity is undesirably raised. These dispersing agents may be either employed solely or in combination.

The wetting agents preferably for dispersing in the invention are sodium dodecylbenzenesulfonate, sodium 2-ethyl-hexylsulfosuccinate, sodium alkylnaphthalenesulfonate, an adduct of phenol with ethylene oxide and an adduct of phenol with ethylene oxide. It is necessary to select the dispersing agent and the wetting agent considering the bubble formation, gelation of the dispersion and the fluidity of the dispersion additionally to their wetting ability, and the fine particle forming ability thereof, because formation of bubbles in the dispersion, gelation of the dispersion and lowering of the fluidity of the dispersion occur some times according to the structure of the disperse dye. Moreover, it is preferable that the dispersing agent and the wetting agent is selected considering the influences on the dying ability to the cloth, dying ratio, uniformity of dying, transfer ability of the dyed image, clarity of the color and fastness, and further considering the fact that the formation of tar from the wetting agent or the dispersing agent causes the unevenness of dying on the occasion of the coloring by heating at high temperature. There is no dispersing agent entirely satisfying such the requirements. Therefore, a useful dispersing agent has to be selected for suiting to the dye to be dispersed, and addition of a defoaming agent is necessary according to necessity.

A dying aid is preferably contained in the ink-jet cloth printing ink or in the cloth to be subjected to the printing when the dying is carried out by a high temperature steam heating means. The dying aid is effective to shorten the temperature rising time by forming a eutectic mixture together with water condensed on the cloth when the printed cloth is heated by steam, so as to inhibit the amount of re-evaporated water. The eutectic mixture has an ability of dissolving the dye on the cloth and accelerating the diffusion of the dye into the fibers. As the dying aid, urea can be cited.

EXAMPLES

The invention is concretely described referring examples below; the invention is not limited to the examples.

Example 1

<Measurement of the Solubility of Dye in the Ink>

A solubility measuring solution was prepared which has the composition the same as the ink except that no dye is added. To the solubility measuring solution, 0.1% of the dye powder was added and stirred for 5 hours. After the stirring, not dissolved dye was completely precipitated and the supernatant liquid was exampled. The concentration of the dye in the supernatant was determined by HPCL. The solubility was represented by the amount of the solute in gram in 100 g of the solution according to the usual expression.

HPLC Measurement Apparatus and Conditions

Degasser: Degassing unit Model 546B, manufactured by GL Science Co. Ltd.

Pump: Intelligent Pump L-6200, Hitach Seisakusho Co., Ltd.

Column gas oven: Manufactured by Gaschro Kogyo Co., Ltd.

Detector: UV-vis Detector L-4200, manufactured by Hitachi Seisakusho Co., Ltd.

Integrator: GPC Integrator D-2520, manufactured by Hitachi Seisakusho Co., Ltd.

Sampler: Intelligent Auto Sampler AS-4000, manufactured by Hitachi Seisakusho Co., Ltd.

Measuring Conditions

Column: Inert Sil ODS-2 (reverse phase silica), 4.6 mm, ID×205 mml

Oven: 40° C.

Flowing amount of the liquid: 0.8 ml/min

Injection amount: 20 µl

Composition of the eluate: Eluate A: Eluate B=30: 70 until 20 minutes, after that Elution A: Elution B=0: 100

Eluate A: 0.1 M ammonium acetate buffer, pH=5

Eluate B: Methanol

Detection wavelength: 260 nm

<Dispersion A>

The following mixture liquid was dispersed by a sand grinder. The dispersing operation was stopped when the average particle diameter is attained at 200 nm.

| | |
|---|---|
| C. I. Disperse Yellow 149 | 25 parts |
| Glycerol | 25 parts |
| Deionized water | 25 parts |
| Sodium ligninsulfonate (Vanilex RN, Nihon Seish Co., Ltd.) | 25 parts |

The average particle diameter was measured by Zetasizer, manufactured by Malvern Instruments Ltd.

<Ink 1>

The following components were mixed, filtered by a 3 µm membrane filter and degassed to prepare Ink 1.

| | |
|---|---|
| Dispersion 1 | 50 parts |
| Ethylene glycol | 40 parts |
| Glycerol | 0 parts |
| Proxel GXL (s) (Abisia Co., Ltd.) | 0.01 parts |
| Floren G-700 (Koeisha Kagaku Co., Ltd.) | 11 parts |
| Deionized water | Remaining Part |

Floren G-700 was previously neutralized by necessary amount of sodium hydroxide.

Inks 2 through 5 having each the composition listed in Table 1 were prepared in a manner similar to that in Ink 1 using Dispersion 1.

The prepared inks were each degassed and packed in vacuum by the following method.

The ink was passed through hollow fiber membranes and the pressure of the outside of membrane was reduced by a water flowing aspirator to remove the gas dissolved in the ink. The passing rate was controlled so that the remaining concentration of the dissolved oxygen was become to 2 ppm.

The concentration of dissolved oxygen was measured by the dissolved oxygen concentration measuring apparatus available on the market DO-30A, manufactured by Toa Denpa Co., Ltd., at 25° C. under 1 atmosphere pressure. The average particle diameter was measured by Zetasizor 1000, manufactured by Malvern Instruments Ltd.

TABLE 1

| | Dispersion | Ethylene glycol | Glycerol | Proxel | Floren | Remarks |
|---|---|---|---|---|---|---|
| Ink 1 | 50 parts | 40 parts | — | 0.01 parts | 11 parts | Comp. |
| Ink 2 | 50 parts | 40 parts | — | 0.01 parts | 7 parts | Inv. |
| Ink 3 | 50 parts | 40 parts | — | 0.01 parts | — | Inv. |
| Ink 4 | 50 parts | 16 parts | 20 parts | 0.01 parts | — | Inv. |
| Ink 5 | 50 parts | 10 parts | 23 parts | 0.01 parts | — | Comp. |

Comp.: Comparative
Inv.: Inventive
Proxel: Proxel GXL (1,2-benzimidazoline-3-one)
Floren: Floren G-700 (Kyoei Kagaku Co., Ltd.)

The solubility of the dye in each of the ink formula was measured by the forgoing method.

[Filtration Test by a Filter]

Two liters of each of the prepared inks was stored for four weeks at 40° C. After that, the ink was passed through a metal mesh filter (#3500 mesh filter having a diameter of 10 mm) to examine occurrence blocking of the mesh and the surface of the filter was observed by an electron microscope.

A: The mesh was not blocked during the filtration of two liters of the ink, and no grown crystal was observed by the electron microscope.

B: The mesh was not blocked during the filtration of two liters of the ink, and grown crystals were observed by the electron microscope.

C: The mesh was blocked after passing of one liter of the ink.

D: The mesh was blocked before passing of one liter of the ink.

[Ejection Suitability Evaluation 1]

The ink was ejected by a piezo type head having 64 nozzles, a nozzle diameter of 40 μm, which was droved by a frequency of 10 kHz to evaluate ejection suitability. The driving voltage was controlled so that the ejecting rate was 6 m/s.

[Stability of Ejection]

Five hundreds ml of the ink was continuously ejected under the conditions of a temperature of 25° C. and a relative humidity of 50%. The variation of the ejecting direction and the lacking of ejection were evaluated according to the following norms until the ink was consumed.

A: Entire nozzles regularly ejected the ink.

B: The variation of the ejecting direction and the lacking of the ejection were observed at 1 through 3 nozzles.

C: The variation of the ejecting direction and the lacking of the ejection were observed at 4 through 7 nozzles.

D: The variation of the ejecting direction and the lacking of the ejection were observed at 8 or more nozzles.

[Ejection Suitability Evaluation 2]

The ejection suitability of the inks were evaluated in the same manner as in the evaluation of ejection suitability 1 except that a piezo type head having 64 nozzles, a nozzle diameter of. 30 μm, which was droved by a frequency of 20 kHz was used and the driving voltage was controlled so that the ejecting rate was 8 m/s.

[Ejection Suitability Evaluation 3]

The ejection suitability of the inks were evaluated in the same manner as in the evaluation of ejection suitability 1 except that a piezo type head having 64 nozzles, a nozzle diameter of 20 μm, which was droved by a frequency of 20 kHz was used and the driving voltage was controlled so that the ejecting rate was 8 m/s.

The results of the evaluation are listed in Table 2.

TABLE 2

| | Solubility | Filtration test | Ejection suitability evaluation 1 | Ejection suitability evaluation 2 | Ejection suitability evaluation 3 | Average particle diameter | Remarks |
|---|---|---|---|---|---|---|---|
| Ink 1 | $1.5 \times 10^{-3}$ | D | A | A | A | 200 nm | Comp. |
| Ink 2 | $1.0 \times 10^{-3}$ | B | B | B | B | 200 nm | Inv. |
| Ink 3 | $1.0 \times 10^{-4}$ | B | B | B | B | 200 nm | Inv. |
| Ink 4 | $1.0 \times 10^{-5}$ | A | B | B | B | 200 nm | Inv. |
| Ink 5 | $0.8 \times 10^{-5}$ | A | D | D | D | 200 nm | Comp. |

Comp.: Comparative
Inv.: Inventive

It was understood that the inks according to the invention were superior to the comparative ink in the filtration test and the ejection suitability.

Example 2

Dispersions 2 through 5 were obtained by the same formula as Dispersion 1 except that the dispersing operation was stopped when the average diameter was attained each at 350 nm, 300 nm, 100 nm and 80 nm, respectively.

Inks 6 through 9 were prepared by the same formulas as Ink 3 and the average diameter of the particles for each ink was measured.

The prepared inks were subjected to the ejection suitability test 1 employing the piezo type head and the filtration test.

TABLE 3

| | Filtration test | Ejection suitability evaluation 1 | Average particle diameter |
|---|---|---|---|
| Ink 6 | D | B | 80 nm |
| Ink 7 | B | B | 100 nm |
| Ink 8 | B | B | 300 nm |
| Ink 9 | D | D | 350 nm |

The inks according to the invention were superior in the filtration test and the ejection suitability.

Example 3

<Preparation of Ink>
(Dispersion-11)

The following mixture liquid was dispersed by a sand grinder; the dispersing was stopped when the average particle diameter was attained at 200 nm.

| | |
|---|---|
| C. I. Disperse Yellow 149 | 25 parts |
| Glycerol | 20 parts |
| Deionized water | 25 parts |
| Sodium ligninsulfonate (Vanilex RN, Nihon Seishi Co., Ltd.) | 25 parts |

(Ink-11)

The following components were mixed and filtered by the 3 μm membrane filter and subjected to the degassing treatment to prepare Ink-11.

| | |
|---|---|
| Dispersion-11 | 50 parts |
| Ethylene glycol | 48 parts |
| Proxel GXL (s) (Abisia Co., Ltd.) | 0.01 parts |
| Calcium chloride in terms of calcium | 0.1 ppm |
| Deionized water | Remained parts |

(Dispersion-12)

The following components were mixed and filtered by the 3 μm membrane filter and subjected to the degassing treatment to prepare Ink 12.

| | |
|---|---|
| C. I. Disperse Blue 60 | 25 parts |
| Glycerol | 20 parts |
| Deionized water | 25 parts |
| Sodium ligninsulfonate (Vanilex RN, Nihon Seishi Co., Ltd.) | 25 parts |

The following components were mixed and filtered by the 3 μm membrane filter and subjected to the degassing treatment to prepare Ink-12.

| (Ink-12) | |
|---|---|
| Dispersion-12 | 50 parts |
| Ethylene glycol | 48 parts |
| Floren G-700 (Kyoei Kagaku Co., Ltd.) | 2.5 parts |
| Proxel GXL (s) (Abisia Co., Ltd.) | 0.01 parts |
| Calcium chloride in terms of calcium | 10000 ppm |
| Deionized water | Remained parts |

Floren G-700 was previously neutralized by a necessary amount of sodium hydroxide.

Inks 13 through 16 having each the compositions listed in Table 4 were prepared in the same manner as in the above.

The each of the inks was passed through hollow fiber membranes and the pressure of the outside of membrane was reduced by a water flowing aspirator to remove the gas dissolved in the ink.

The solubility of the dye in each of the ink formulas was measured by the measuring method the same as in Example 1. In the case of the ink containing the poly-valent metal, the measurement was carried out in the state of containing the poly-valent metal.

TABLE 4

| Ink No. | Dispersion | Ethylene glycol | Proxel | Floren | Calcium chloride | Solubility | Remarks |
|---|---|---|---|---|---|---|---|
| Ink 11 | 50 parts | 48 parts | 0.01 parts | — | 0.1 ppm | $5 \times 10^{-5}$ | Inv. |
| Ink 12 | 50 parts | 40 parts | 0.01 parts | 2.5 parts | 10000 ppm | $5 \times 10^{-5}$ | Inv. |
| Ink 13 | 50 parts | 40 parts | 0.01 parts | 2.5 parts | — | $5 \times 10^{-5}$ | Inv. |
| Ink 14 | 50 parts | 40 parts | 0.01 parts | 2.5 parts | 100 ppm | $5 \times 10^{-5}$ | Inv. |
| Ink 15 | 50 parts | 40 parts | 0.01 parts | 2.5 parts | 10 ppm | $5 \times 10^{-5}$ | Inv. |
| Ink 16 | 50 parts | 40 parts | 0.01 parts | 2.5 parts | 1000 ppm | $5 \times 10^{-5}$ | Inv. |

Prepared inks were subjected to the following evaluations.

<<Evaluation>>

(Crystal growth test)

The prepared inks were each stored for one week and two weeks. After that the shape of the particle was observed by the electron microscope with a magnitude of 20,000 times. It is judged that the growth of the crystal occurred when a rod like-shaped particle was observed.

B: No grown particle was observed.

C: Particles of 300 nm to 500 nm were observed.

D: Grown particles were observed.

(Test for Viscosity Increasing)

The viscosity of the ink was measured after the storage of two weeks by an ink viscometer. It is judged that the viscosity of the ink was increased when the viscosity was raised by 0.5 mPa·s or more compared with the viscosity of the ink just after the preparation.

B: Viscosity was not increased.

C: Increasing of viscosity of from 0.3 mPa·s to 0.5 mPa·s was observed.

D: Viscosity was increased.

Results of the tests of the crystal growing and the viscosity increasing are listed in Table 4.

TABLE 5

| Ink No. | Test for crystal growing 1 week | Test for crystal growing 2 weeks | Test for viscosity increasing | Remarks |
|---|---|---|---|---|
| Ink 11 | C | C | B | Inv. |
| Ink 12 | B | B | C | Inv. |
| Ink 13 | C | C | B | Inv. |
| Ink 14 | B | B | B | Inv. |
| Ink 15 | B | B | B | Inv. |
| Ink 16 | B | B | B | Inv. |

It was understood that the inks having a content of the poly-valent metal was without the range of from 1 to 1000 ppm were inferior in some -degree in the crystal growing and the viscosity increasing in the inks according to the invention.

Example 4

Inks 21 through 28 were prepared in the same manner as in Ink 12 of Example 3 except that the poly-valent metals shown in Table 6 were employed in place of the calcium chloride.

TABLE 6

| Ink No. | Poly-valent metal Kind | Poly-valent metal Added amount | Poly-valent metal Kind | Poly-valent metal Added amount | Solubility | Remarks |
|---|---|---|---|---|---|---|
| Ink 21 | Zinc chloride | 100 ppm | — | — | $5 \times 10^{-5}$ | Inv. |
| Ink 22 | Aluminum chloride | 100 ppm | — | — | $5 \times 10^{-5}$ | Inv. |
| Ink 23 | Copper chloride | 100 ppm | — | — | $5 \times 10^{-5}$ | Inv. |
| Ink 24 | Nickel chloride | 100 ppm | — | — | $5 \times 10^{-5}$ | Inv. |
| Ink 25 | Iron chloride | 100 ppm | — | — | $5 \times 10^{-5}$ | Inv. |
| Ink 26 | Cobalt chloride | 100 ppm | — | — | $5 \times 10^{-5}$ | Inv. |
| Ink 27 | Calcium chloride | 50 ppm | Zinc chloride | 50 ppm | $5 \times 10^{-5}$ | Inv. |
| Ink 28 | Calcium chloride | 50 ppm | Iron chloride | 50 ppm | $5 \times 10^{-5}$ | Inv. |

The above-prepared inks were subjected to the tests the same as in Example 3. Results of the tests are listed in the following Table 7.

TABLE 7

| Ink No. | Test for crystal growing 1 week | Test for crystal growing 2 weeks | Test for viscosity increasing | Ejection suitability evaluation 1 | Ejection suitability evaluation 2 | Remarks |
|---|---|---|---|---|---|---|
| Ink 21 | B | B | B | B | B | Inv. |
| Ink 22 | B | B | B | B | B | Inv. |
| Ink 23 | B | B | B | B | B | Inv. |
| Ink 24 | B | B | B | B | B | Inv. |
| Ink 25 | B | B | B | B | B | Inv. |
| Ink 26 | B | B | B | B | B | Inv. |
| Ink 27 | B | B | B | B | B | Inv. |
| Ink 28 | B | B | B | B | B | Inv. |

Inv.: Inventive

It was understood that the inks according to the invention were superior in each of their properties.

Example 5

Images were printed ink-jet on cloth containing polyester fibers employing the inks prepared in Example 3 and the piezo type head having 64 nozzles each having a diameter of 20 μm and driven by a frequency of 30 kHz. The driving voltage was controlled so that the droplet speed was 8 m/s. The images formed by the inks according to the invention had high image density and were superior in the anti-spreading ability. Moreover, no problem occurred on the ejection during the prolonged ink-jet printing operation.

What is claimed is:

1. An ink-jet cloth printing ink comprising a disperse dye, a dispersing agent, a poly-valent metal, water and a water-soluble organic solvent, wherein the average particle diameter of the disperse dye is from 100 nm to 300 nm, the solubility of the dye in the ink is from $10^{-5}$ to $10^{-3}$ and the total content of the poly-valent metal in the ink is 100 ppm to 1,000 ppm.

2. The Ink-jet cloth printing ink of claim 1, wherein the dye solubility is $10^{-5}$ to $10^{-4}$.

3. The ink-jet cloth printing ink of claim 1, wherein the disperse dye has a structure capable of forming a chelate compound with the poly-valent metal.

4. The ink-jet cloth printing ink of claim 1, wherein the poly-valent metal is at least one of Ca, Mg, Ti, Al, Zn, Fe, Co, Ni and Cu.

5. The ink-jet cloth printing ink of claim 1, wherein the ink is deaerated by a hollow fiber membrane module.

6. An ink-jet recording method comprising the step of ejecting the ink-jet cloth printing ink of claim 1 from an ink-jet head, wherein the ink-jet head has a nozzle diameter of not more than 30 μm.

7. An ink-jet recording method comprising the step of ejecting the ink-jet cloth printing ink of claim 1 from an ink-jet head, wherein the ink-jet head is driven by a driving frequency of not less than 20 khz.

8. An ink-jet recording method comprising the step of ejecting the ink-jet cloth printing ink of claim 1 from an ink-jet head, wherein the ink-jet head ejects the ink in a rate of not less than 6 m per second.

9. An ink-jet recording method comprising the step of ejecting the ink-jet cloth printing ink of claim 1 onto cloth containing polyester fibers.

10. An ink-jet recording method comprising the step of ejecting the ink-jet cloth printing ink of claim 1 from an ink-jet head onto cloth containing a polyester fiber, wherein the ink-jet head has a nozzle diameter of not more than 30 µm.

11. The ink-jet cloth printing ink of claim 3, wherein the disperse dye has a chemical structure represented by one of the following formulae

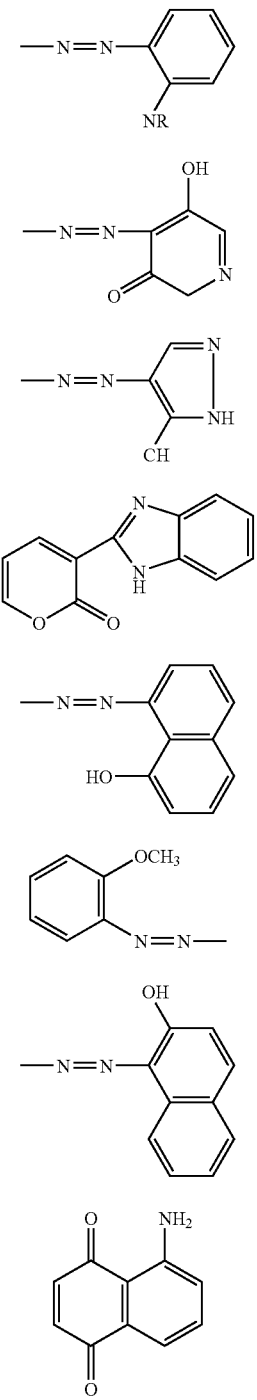

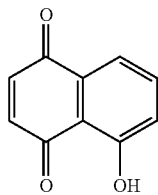

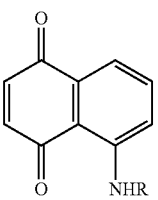

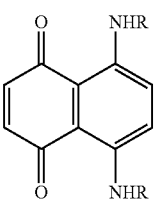

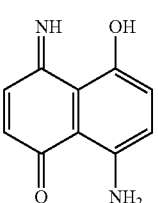

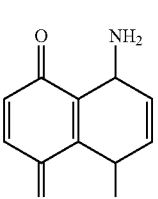

wherein R is a hydrogen atom or an alkyl group.

12. An ink-jet cloth printing ink comprising a disperse dye, a dispersing agent, a poly-valent metal, water and a water-soluble organic solvent, wherein the average particle diameter of the disperse dye is from 100 nm to 300 nm, the solubility of the dye in the ink is from $10^{-5}$ to $10^{-3}$, and the disperse dye has a structure capable of forming a chelate compound with the poly-valent metal, and the total content of the poly-valent metal in the ink is 100 ppm to 1,000 ppm.

* * * * *